United States Patent
Hoffmann et al.

(10) Patent No.: US 10,182,229 B2
(45) Date of Patent: Jan. 15, 2019

(54) DEVICE FOR MONITORING A VEHICLE ENVIRONMENT

(71) Applicant: Robert Bosch GmbH, Stuttgart (DE)

(72) Inventors: Christian Hoffmann, Leonberg (DE); Michael Schoenherr, Renningen-Malmsheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 387 days.

(21) Appl. No.: 14/649,460

(22) PCT Filed: Nov. 29, 2013

(86) PCT No.: PCT/EP2013/075121
§ 371 (c)(1),
(2) Date: Jun. 3, 2015

(87) PCT Pub. No.: WO2014/090604
PCT Pub. Date: Jun. 19, 2014

(65) Prior Publication Data
US 2015/0304649 A1    Oct. 22, 2015

(30) Foreign Application Priority Data
Dec. 10, 2012  (DE) ........................ 10 2012 222 668

(51) Int. Cl.
*G06K 9/00*       (2006.01)
*H04N 17/00*      (2006.01)
(Continued)

(52) U.S. Cl.
CPC ............. *H04N 17/002* (2013.01); *B60R 1/00* (2013.01); *G01S 15/025* (2013.01); *G01S 15/931* (2013.01); *G01S 2007/52009* (2013.01)

(58) Field of Classification Search
USPC ......................................................... 348/148
See application file for complete search history.

(56) References Cited

U.S. PATENT DOCUMENTS

| | | | |
|---|---|---|---|
| 5,027,200 A * | 6/1991 | Petrossian | B60R 1/00 348/118 |
| 5,276,389 A * | 1/1994 | Levers | B60S 1/0818 318/444 |
| 5,671,035 A * | 9/1997 | Barnes | G02C 7/101 351/158 |

(Continued)

FOREIGN PATENT DOCUMENTS

| | | |
|---|---|---|
| CN | 201 594 | 9/2010 |
| CN | 201594146 U | 9/2010 |

(Continued)

OTHER PUBLICATIONS

International Search Report for PCT/EP2013/074121, dated Mar. 18, 2014.

*Primary Examiner* — Chikaodili E Anyikire
(74) *Attorney, Agent, or Firm* — Norton Rose Fulbright US LLP; Gerard Messina

(57) ABSTRACT

A device for monitoring the vehicle environment includes: a first sensor for sensing the vehicle environment, the first sensor featuring a first sensing region; a second sensor for sensing the vehicle environment; and an evaluation unit. The second sensor for sensing the vehicle environment is situated within the first sensing region, and a diagnosis of the second sensor is achieved with the aid of the evaluation unit.

12 Claims, 2 Drawing Sheets

(51) Int. Cl.
  *G01S 15/93*   (2006.01)
  *G01S 15/02*   (2006.01)
  *B60R 1/00*    (2006.01)
  *G01S 7/52*        (2006.01)

(56) References Cited

U.S. PATENT DOCUMENTS

| | | | | |
|---|---|---|---|---|
| 5,793,308 | A * | 8/1998 | Rosinski | B60Q 1/0023 |
| | | | | 340/436 |
| 6,476,731 | B1 * | 11/2002 | Miki | B60Q 1/0023 |
| | | | | 340/435 |
| 6,891,563 | B2 * | 5/2005 | Schofield | B60R 1/00 |
| | | | | 348/143 |
| 6,911,997 | B1 * | 6/2005 | Okamoto | B60R 1/00 |
| | | | | 348/148 |
| 7,049,945 | B2 * | 5/2006 | Breed | B60Q 9/008 |
| | | | | 340/435 |
| 8,620,613 | B2 * | 12/2013 | Segawa | G07C 3/08 |
| | | | | 702/128 |
| 2003/0187557 | A1 * | 10/2003 | Shockley | G01M 17/007 |
| | | | | 701/39 |
| 2008/0239076 | A1 * | 10/2008 | Luo | G06K 9/00798 |
| | | | | 348/148 |
| 2013/0147956 | A1 * | 6/2013 | Ehlgen | H04N 7/188 |
| | | | | 348/148 |
| 2014/0184799 | A1 * | 7/2014 | Kussel | G01B 11/272 |
| | | | | 348/148 |

FOREIGN PATENT DOCUMENTS

| | | |
|---|---|---|
| DE | 10 2004 028 860 | 1/2005 |
| DE | 10 2006 044 786 | 3/2008 |
| JP | 2001155286 A | 6/2001 |
| KR | 100 943 410 | 2/2010 |
| KR | 2012 0130453 | 12/2012 |
| WO | WO 2009/109231 | 9/2009 |

* cited by examiner

DEVICE FOR MONITORING A VEHICLE ENVIRONMENT

BACKGROUND OF THE INVENTION

1. Field of the Invention

The present invention relates to a device for monitoring a vehicle environment.

2. Description of the Related Art

Motor vehicles are increasingly equipped with devices for monitoring the vehicle environment, which improve the general view and thus can assist in maneuvering or parking, as well. Different types of sensors, e.g., ultrasonic sensors, video cameras, lidar sensors etc. are used for this purpose. Because of functionalities in the automotive field that feature a high degree of automation, such as fully automatic parking, the demands on sensors with regard to accuracy, robustness and reliability become ever greater. The diagnosis or self-diagnosis possibilities of sensors are therefore of increasing importance. Devices for monitoring the vehicle environment with the aid of multiple sensors, such as ultrasonic sensors combined with rear-view cameras, are known from the related art. The related art furthermore includes sensors having additional systems for self-diagnosis. The German patent application publication DE 10 2006 044 786 A1 describes a camera system in a camera-based assistance system of a vehicle, in which a check beam is generated in order to check for soiling of a transparent check body situated on the camera, whereupon a partial beam of the check beam indicative of soiling is detected. The German patent application publication DE 10 2004 028 860 A1 describes an object detection device for vehicles, which is provided in order to detect adhering dirt on a radar. The device includes a dirt-detection circuit for this purpose, which can determine whether dirt adheres to the radar on the basis of time measurements.

BRIEF SUMMARY OF THE INVENTION

It is the object of the present invention to provide a device for monitoring the vehicle environment, which has at least one first sensor and one second sensor for sensing the vehicle environment and which allows a state detection or diagnosis of the second sensor with the aid of the first sensor.

The present invention is based on a device for monitoring the vehicle environment, which includes a first sensor for sensing the vehicle environment, a second sensor for sensing the vehicle environment, as well as an evaluation unit, the first sensor for sensing the vehicle environment having a first sensing region. The core of the invention is that the second sensor for sensing the vehicle environment is disposed within the first sensing region, and a diagnosis of the second sensor is possible with the aid of the evaluation unit. As a result, a diagnosis of the second sensor with the aid of the first sensor is implemented according to the present invention. The diagnosis of the second sensor advantageously does not require any self-diagnosis system within or on the second sensor. It is also advantageous that the first sensor is used not only for monitoring the vehicle, but additionally enables a diagnosis of the second sensor as a second functionality. According to one advantageous development of the present invention, the first sensor is a camera. The camera advantageously makes it possible to sense the external state of the second sensor, and it can be ascertained in particular whether the second sensor is dirty or also damaged on the outside. It is especially advantageous that the second sensor is situated within the opening angle of the camera. Rear-view cameras for sensing the vehicle environment often have a wide-angle lens. The second sensor is advantageously situated within the opening angle of this wide-angle lens of the camera. This makes it possible to optically detect and evaluate the external state, especially the wear degree of the second sensor, in a direct manner. According to one advantageous development of the present invention, the second sensor is an ultrasonic sensor. Ultrasonic sensors are usually disposed in the bumper in order to ensure sensing of the vehicle environment by distance detection in the near range. However, ultrasonic sensors also get dirty very easily in this installation location. The diagnosis of the ultrasonic sensor is therefore of special importance for the device for monitoring the vehicle environment. According to another advantageous further development of the present invention, the second sensor is a camera. In camera-based devices for monitoring the vehicle environment, this makes it possible for a first camera to diagnose the second camera, or for two or more cameras to diagnose each other. In one advantageous development of the present invention, superficial soiling of the second sensor is able to be diagnosed. The first sensor for sensing the vehicle environment is advantageously situated outside the second sensor for sensing the vehicle environment, so that it is able to determine the external state, in particular superficial soiling, of the second sensor. Such superficial soiling is not easily diagnosable by a possible self-test of the second sensor, because the internal functionalities of the sensor are often not affected by such soiling.

The present invention also relates to a method for diagnosing a second sensor for sensing the vehicle environment with the aid of a device for monitoring the vehicle environment, which includes a first sensor and a second sensor for sensing the vehicle environment, as well as an evaluation unit, the first sensor for sensing the vehicle environment having a first sensing region, and the second sensor for sensing the vehicle environment being situated within the first sensing region. The method of the present invention is characterized by the following steps:

(A) Data acquiring in a first sensing region using the first sensor
(B) Supplying the acquired data in the evaluation unit
(C) Supplying reference data in the evaluation unit
(D) Comparing the acquired data with the reference data
(E) Diagnosing the second sensor by analyzing the comparison carried out in step (D).

The method of the present invention advantageously allows a diagnosis of the second sensor. It is possible, in particular, to determine, by a comparison with reference data, a change in the second sensor as compared to an earlier state, which has been stored in the form of the reference data.

DETAILED DESCRIPTION OF THE INVENTION

Figure 1:
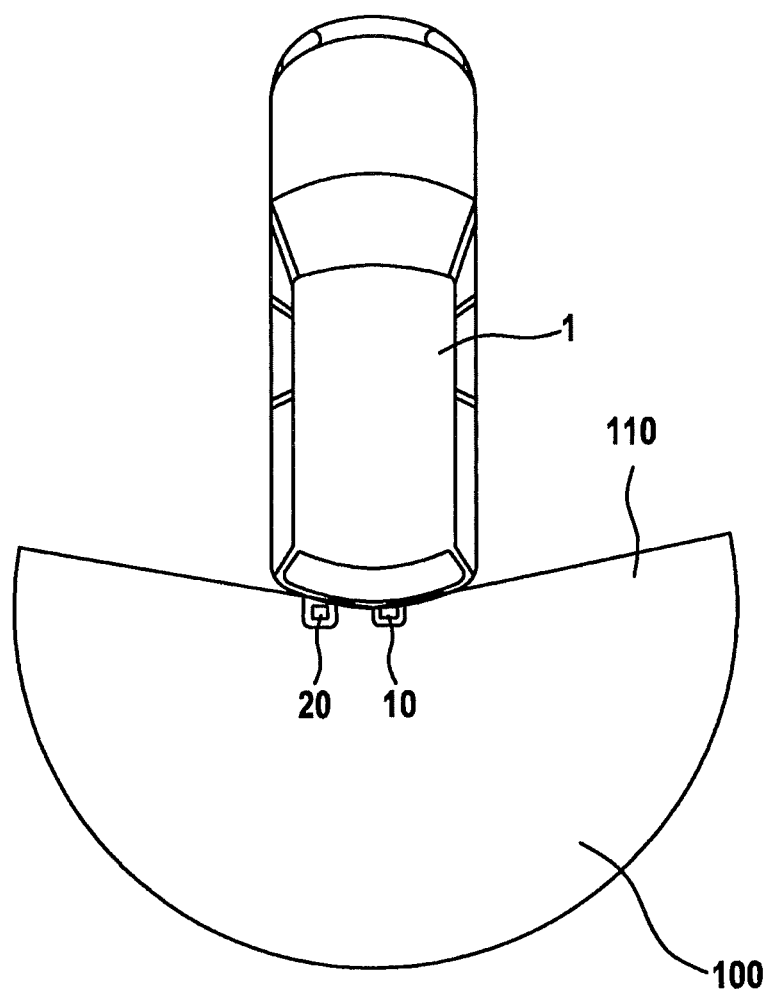
FIG. 1 shows a vehicle having a system made up of a first sensor and a second sensor for sensing the vehicle environment of the device for vehicle environment monitoring according to the present invention.

FIG. 1 shows a vehicle provided with a system of a first sensor and a second sensor for sensing the vehicle environment of the device for monitoring the vehicle environment according to the present invention. The exemplary embodiment shows a vehicle 1 having a first sensor 10 for monitoring the vehicle environment, which is mounted on a rear end of the vehicle. Sensor 10 features a sensing region 100, which is delimited by an opening angle 110 and the range of the sensor. Sensor 10 may be a rear-view camera, for example. A second sensor 20 for sensing the vehicle environment is situated in the sensing region of first sensor 10. Second sensor 20, for example, may be an ultrasonic sensor, which is situated on the rear bumper of vehicle 1. The placement of second sensor 20 in sensing region 100 of first sensor 10 makes it possible for first sensor 10 to detect second sensor 20 as well. In the scenario described here, where first sensor 10 is a camera, this means that the camera optically detects second sensor 20 and therefore is able to reproduce an image of the external state of this second sensor 20. Changes in the external state of second sensor 20 in comparison with an earlier or reference state are able to be ascertained with the aid of image processing means. Determined changes in the state of second sensor 20 can be evaluated in order to ascertain whether this sensor is soiled, for example, or damaged on the outside. This makes it possible to obtain information or an evaluation regarding the reliability of second sensor 20, which may be considered in its further use for sensing the vehicle environment.

Figure 2:
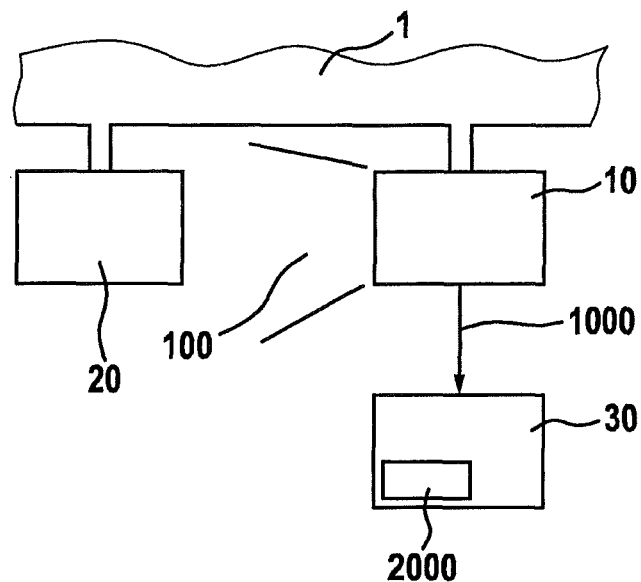
FIG. 2 schematically illustrates a device for monitoring the vehicle environment according to the present invention.

FIG. 2 schematically depicts a device for monitoring the vehicle environment according to the present invention. FIG. 2 schematically illustrates vehicle 1 on which first sensor 10 and second sensor 20 have been mounted mechanically. First sensor 10 has a sensing region 100, which also includes second sensor 20. Data 1000 acquired by first sensor 10 are forwarded to an evaluation unit 30, where reference data 2000 are stored. By comparing the acquired data 1000 with reference data 2000, the state of second sensor 20 is able to be inferred, and second sensor 20 therefore be diagnosed.

Figure 3:
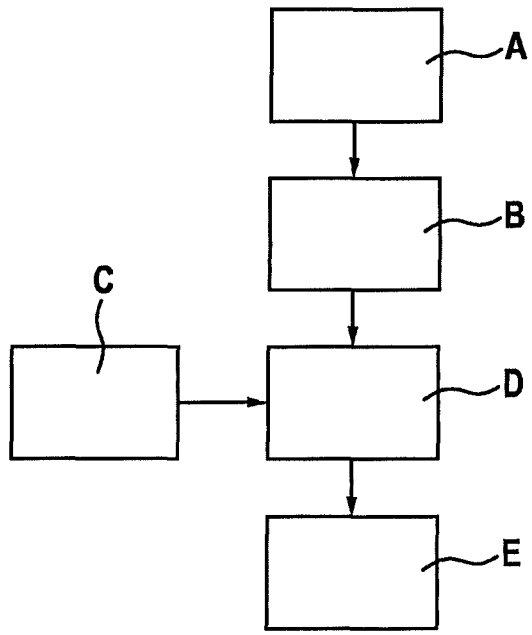
FIG. 3 schematically illustrates a method for diagnosing a second sensor for monitoring the vehicle environment according to the present invention.

FIG. 3 schematically shows a method for diagnosing a second sensor for sensing the vehicle environment according to the present invention. The operating method is carried out by a device according to the present invention as described above. The method of the present invention is characterized by the steps:

(A) Acquiring data 1000 in the first sensing range 100 using first sensor 10
(B) Supplying acquired data 1000 in evaluation unit 30
(C) Supplying reference data 2000 in evaluation unit 30
(D) Comparing acquired data 1000 to reference data 2000
(E) Diagnosing second sensor 20 by analyzing the comparison carried out in step (D).

In the method according to the present invention, step (A) must be executed prior to step (B). Step (C) is independent of steps (A) and (B). However, steps (B) and (C) must take place prior to step (D). Step (E) follows step (D).

What is claimed is:

1. A device for monitoring a vehicle environment, comprising:
    a first sensor mounted on an outside portion of the vehicle, the first sensor for sensing an environment outside of the vehicle, the first sensor being configured to acquire data from a first sensing region;
    a second sensor mounted on an outside portion of the vehicle, the second sensor for sensing the environment outside of the vehicle, the second sensor being situated within the first sensing region; and
    an evaluation unit configured to perform a diagnosis of the second sensor, wherein the evaluation unit is configured to diagnose the second sensor based on sensor data acquired by the first sensor;
    wherein the sensor data from the first sensor includes an image of at least a portion of the second sensor, the evaluation unit diagnosing the second sensor based on the image of the at least portion of the second sensor.

2. The device as recited in claim 1, wherein the first sensor is a camera.

3. The device as recited in claim 2, wherein the second sensor is situated within an opening angle of the camera.

4. The device as recited in claim 3, wherein the second sensor is an ultrasonic sensor.

5. The device as recited in claim 3, wherein the second sensor is a camera.

6. The device as recited in claim 1, wherein the evaluation unit is configured to diagnose a superficial soiling of the second sensor based on the image of the at least portion of the second sensor.

7. A device for monitoring a vehicle environment, comprising:
    a first sensor for sensing the vehicle environment, the first sensor being configured to acquire data from a first sensing region;
    a second sensor for sensing the vehicle environment, the second sensor being situated within the first sensing region; and
    an evaluation unit configured to perform a diagnosis of the second sensor;
    wherein the first sensor is a camera;
    wherein the second sensor is situated within an opening angle of the camera;
    wherein the evaluation unit is configured to diagnose a superficial soiling of the second sensor based on sensor image data acquired by the camera, the sensor image data including an image of at least a portion of the second sensor.

8. The device as recited in claim 7, wherein the evaluation unit is configured to diagnose the superficial soiling based on the image of the at least portion of the second sensor.

9. The device as recited in claim 7, wherein the second sensor is an ultrasonic sensor.

10. A method for diagnosing a second sensor of a monitoring device for sensing a vehicle environment, the monitoring device additionally having an evaluation unit and a first sensor configured to acquire data from a first sensing region, the method comprising:
    (A) acquiring data from the first sensing region using the first sensor, the first sensor being mounted on an outside portion of the vehicle and being configured to sense an environment outside of the vehicle;
    (B) supplying the acquired data from the first sensor to the evaluation unit;
    (C) supplying reference data to the evaluation unit;
    (D) comparing the acquired data with the reference data; and
    (E) diagnosing, by the evaluation unit, the second sensor based on the comparison carried out in step (D), the second sensor being mounted on an outside portion of the vehicle at least partially within the first sensing region of the first sensor, and being configured to sense an environment outside of the vehicle, wherein the acquired data includes an image of at least a portion of the second sensor, the evaluating unit diagnosing the second sensor based on the image of the at least portion of the second sensor.

11. The method as recited in claim 10, wherein the evaluation unit diagnoses a superficial soiling of the second sensor based on the image.

12. The method as recited in claim 10, wherein the second sensor is an ultrasonic sensor.

\* \* \* \* \*